United States Patent
Uesaka et al.

(10) Patent No.: US 9,395,487 B2
(45) Date of Patent: Jul. 19, 2016

(54) WAVELENGTH MONITOR

(71) Applicant: Sumitomo Electric Industries, Ltd., Osaka-shi (JP)

(72) Inventors: Katsumi Uesaka, Yokohama (JP); Yutaka Onishi, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/493,523

(22) Filed: Sep. 23, 2014

(65) Prior Publication Data

US 2015/0085292 A1 Mar. 26, 2015

(30) Foreign Application Priority Data

Sep. 26, 2013 (JP) ................. 2013-200352

(51) Int. Cl.
| | |
|---|---|
| *G01B 9/02* | (2006.01) |
| *G02B 6/10* | (2006.01) |
| *G01J 9/02* | (2006.01) |
| *G02B 6/42* | (2006.01) |
| *G02B 6/12* | (2006.01) |

(52) U.S. Cl.
CPC ............... *G02B 6/10* (2013.01); *G01J 9/0246* (2013.01); *G02B 6/12007* (2013.01); *G02B 6/4215* (2013.01); *G02B 6/12009* (2013.01); *G02B 2006/1215* (2013.01); *G02B 2006/12061* (2013.01)

(58) Field of Classification Search
CPC ............. G01J 9/00; G01J 9/02; G01J 9/0246; G01J 2009/0257; G01J 2009/0261; G01J 2009/0265
See application file for complete search history.

(56) References Cited

U.S. PATENT DOCUMENTS

| | | | | |
|---|---|---|---|---|
| 6,445,477 | B1* | 9/2002 | Madsen ............... | G01J 9/0246 372/32 |
| 2004/0096143 | A1* | 5/2004 | Shpantzer .......... | G02B 6/12004 385/16 |
| 2005/0185187 | A1* | 8/2005 | Dorrer ..................... | G01J 9/02 356/450 |
| 2011/0122906 | A1* | 5/2011 | Seeley .................. | G01J 9/0246 372/38.07 |

FOREIGN PATENT DOCUMENTS

| | | |
|---|---|---|
| JP | 2001-308444 A | 11/2001 |
| JP | 2002-202190 A | 7/2002 |

\* cited by examiner

*Primary Examiner* — Michael A Lyons
(74) *Attorney, Agent, or Firm* — Venable LLP; Michael A. Sartori; Laura G. Remus

(57) ABSTRACT

Provided are an optical element and a wavelength monitor capable of detecting a wavelength with high accuracy and at high speed while suppressing a size. The optical element includes: a branch waveguide section configured to branch an input light beam and generate two outputs routed via paths having mutually different optical path lengths; and an optical synthesis section configured to synthesize the two outputs and output two optical signals having different light intensities with regards to a wavelength of the input light beam and exhibiting a mutual phase difference.

5 Claims, 12 Drawing Sheets

EXAMPLE 1

(a)

(b)

WAVELENGTH MONITOR

BACKGROUND OF THE INVENTION

1. Field of the Invention

The present invention relates to an optical element and a wavelength monitor.

2. Related Background Art

Technologies are disclosed in which a first photodiode that monitors light transmitting an optical filter having a wavelength periodicity and a second photodiode that monitors total optical power incident on the optical filter are provided and by using outputs of these two photodiodes, a wavelength is monitored (for instance, refer to Patent Literature 1).

Also, technologies are disclosed in which a wavelength is monitored by using outputs of two photodiodes that monitor two light beam outputs transmitting optical filter means that materializes from a single etalon filter two light transmission characteristics in which amplitude periods are relatively shifted by $\pi/2$ (for instance, refer to Patent Literature 2).

Patent Literature 1: Japanese Patent Application Laid-Open Publication No. 2001-308444

Patent Literature 2: Japanese Patent Application Laid-Open Publication No. 2002-202190

SUMMARY OF THE INVENTION

With a technology of Patent Literature 1, wavelengths corresponding to crests or troughs of transmission characteristics become dead bands and in the dead bands, monitoring wavelengths becomes difficult. For monitoring an arbitrary wavelength, it is required to change a temperature or an angle of an etalon filter to shift positions of crests or troughs of transmission characteristics, which makes high-speed operation difficult. With a technology of Patent Literature 2, it is required to control an angle of incidence of a beam with accuracy equal to or less than 0.1°. In case that using two identical etalons to generate a phase difference of $\pi/2$, two temperature control apparatuses are required to independently control a temperature of each etalon, and a size problem occurs.

The present invention is made in view of the above-mentioned problem, and the objective is to provide an optical element and a wavelength monitor, capable of detecting a wavelength with high accuracy at high speed while suppressing a size.

An optical element associated with one aspect of the present invention is characterized by including: a branch waveguide section configured to branch an input light beam and generate two outputs routed via paths having mutually different optical path lengths; and an optical synthesis section configured to synthesize the two outputs and output two optical signals having different light intensities with regards to a wavelength of the input light beam and exhibiting a mutual phase difference. The output phase difference of the optical synthesis section may be 90°. The optical synthesis section may include a multimode interferometer. The optical synthesis section may include any one of a 4 inputs 4 outputs multimode interferometer, a combination of a 2 inputs 2 outputs multimode interferometer and an optical delay section to cause an optical delay, or a combination of a 1 input 2 outputs multimode interferometer and a 2 inputs 2 outputs multimode interferometer. The branch waveguide section and the optical synthesis section may be integrated on a same substrate. The input light beam may be coupled to one end of an output of an optical branch and the other end of the optical branch may be output as a signal representing light intensity of the input light beam.

A wavelength monitor associated with one aspect of the present invention is characterized by including: a branch waveguide section configured to branch an input light beam and generate two outputs routed via paths having mutually different optical path lengths; an optical synthesis section configured to synthesize the two outputs and output two optical signals having different light intensities with regards to a wavelength of the input light beam and exhibiting a mutual phase difference; and a first photodiode and a second photodiode that are provided corresponding to two optical signals output from the optical synthesis section to two current signals. The wavelength monitor may further include a temperature control apparatus configured to maintain a temperature of the branch waveguide section and the optical synthesis section at an instructed temperature. A third photodiode, and an optical branch, one end of which is coupled to the branch waveguide section and the other end of which is coupled to the third photodiode that converts an optical input to a current signal representing intensity of the input light beam of the wavelength monitor, may further be provided. The output phase difference of the optical synthesis section may be 90°. The optical synthesis section may include a multimode interferometer. The optical synthesis section may include any one of a 4 inputs 4 outputs multimode interferometer, a combination of a 2 inputs 2 outputs multimode interferometer and an optical delay section to cause an optical delay, or a combination of a 1 input 2 outputs multimode interferometer and a 2 inputs 2 outputs multimode interferometer. The branch waveguide section and the optical synthesis section may be integrated on a same substrate.

According to the above-mentioned aspects of the present invention, for instance, it is possible to provide an optical element and a wavelength monitor, capable of detecting a wavelength with high accuracy at high speed while suppressing a size.

Figure 7:
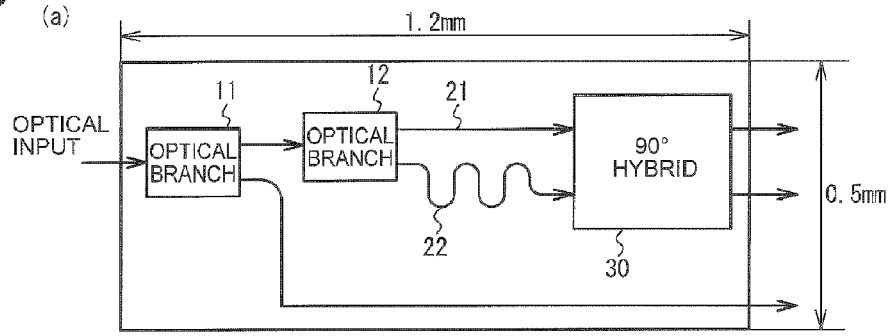
Figure 7:
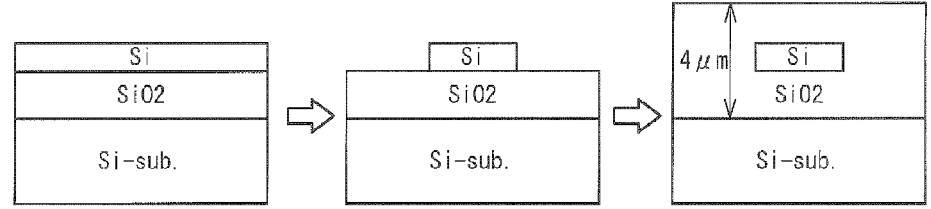
Figure 8:
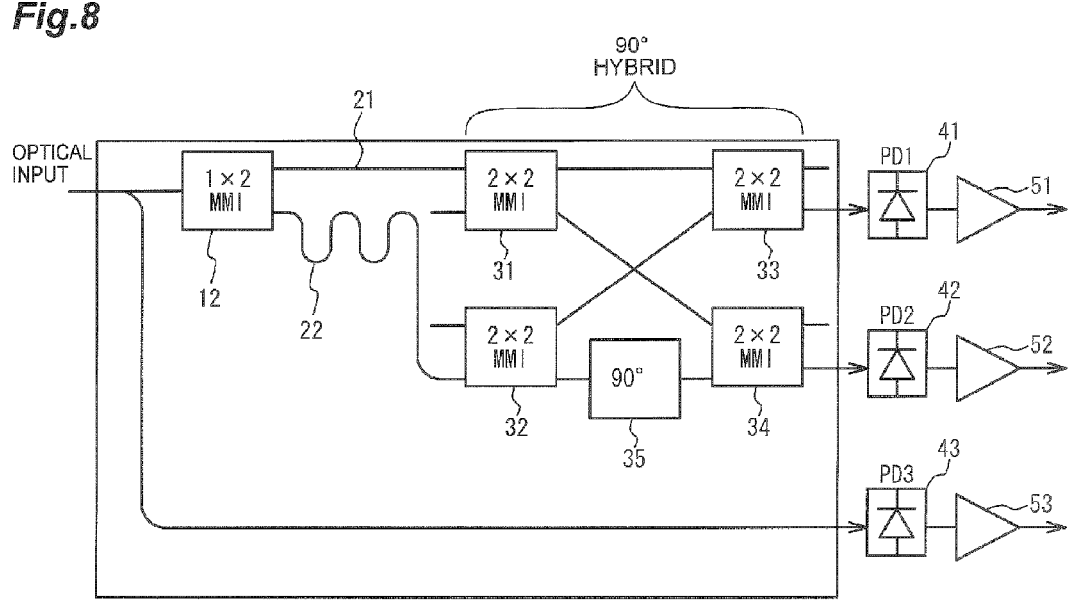
Figure 9:
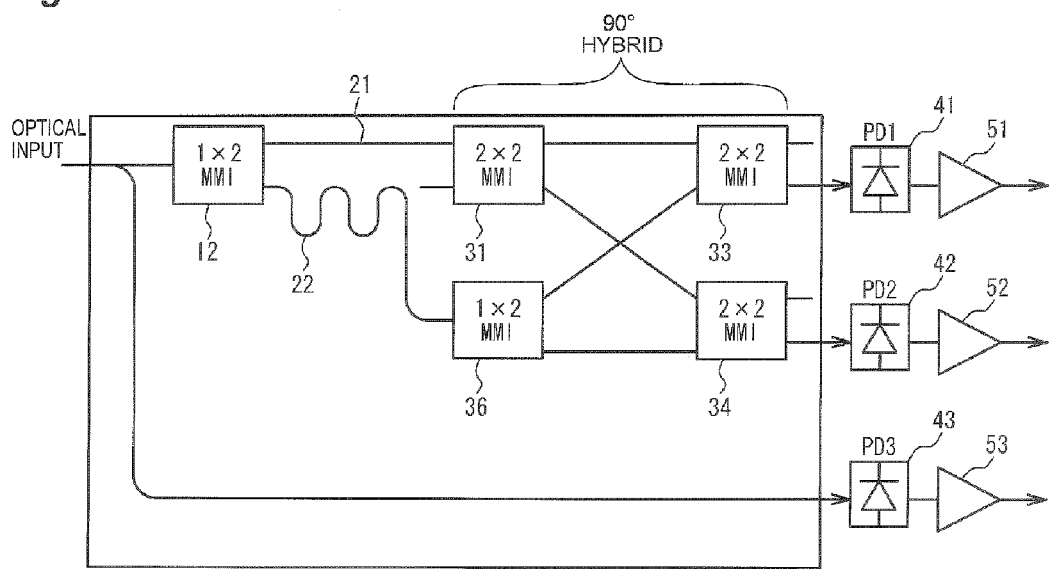
Figure 10:
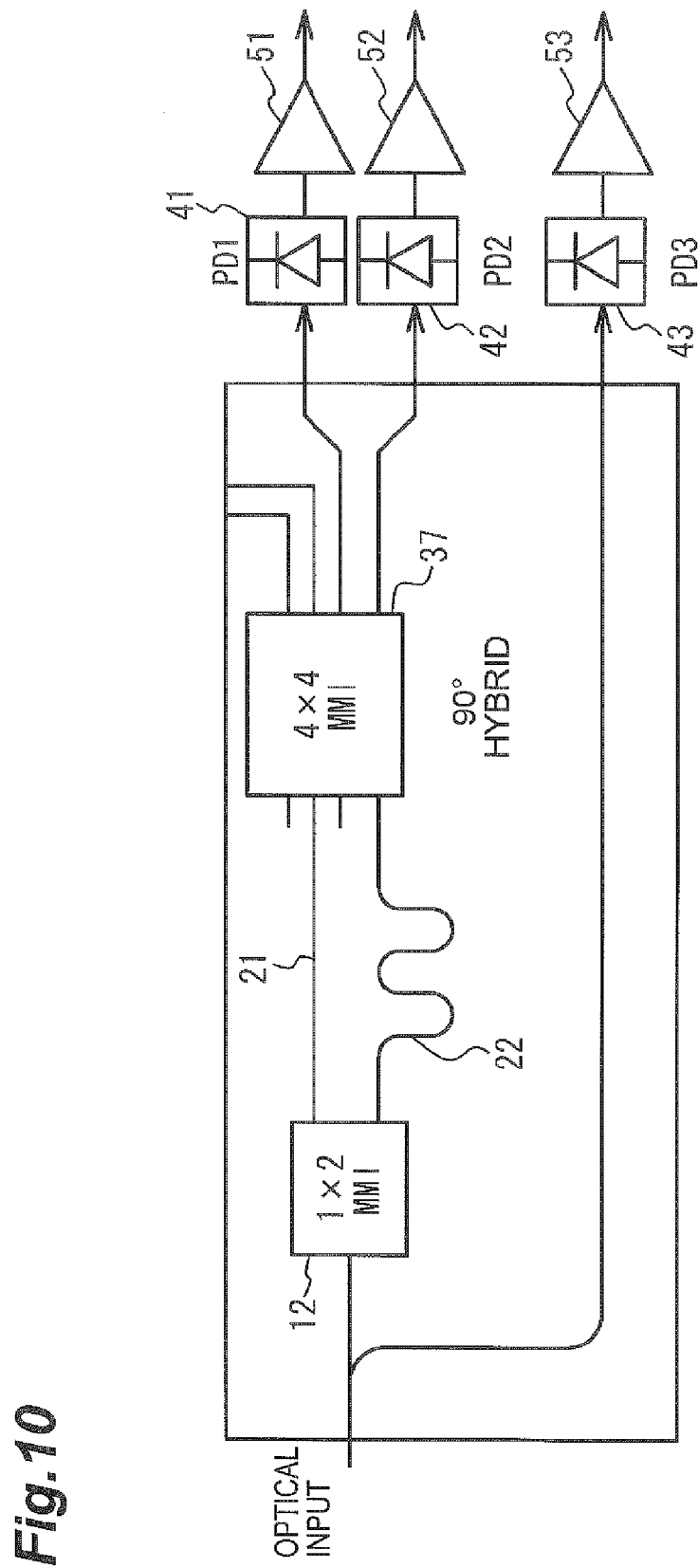
Figure 11:
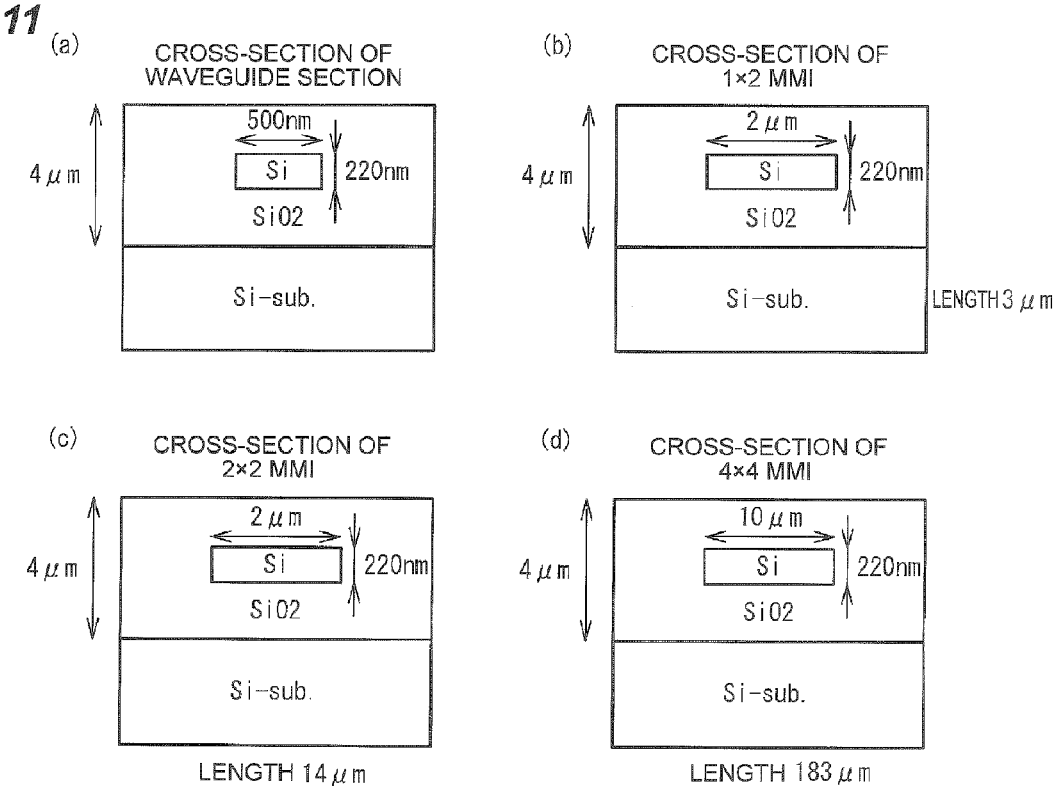
Figure 12:
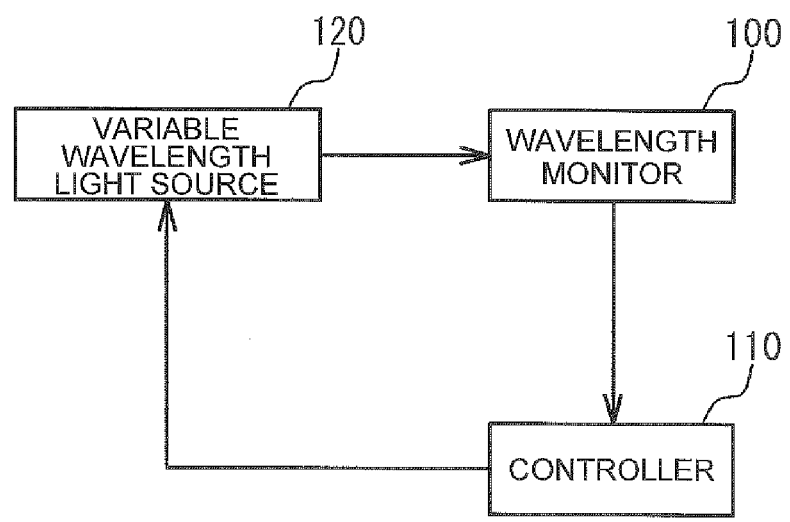

(a) of FIG. 7 is a view illustrating a chip size constituting a waveguide type device, and (b) of FIG. 7 is a view illustrating one example of a manufacturing process of a waveguide;

FIG. 8 is a view illustrating one example of 90° hybrid;

FIG. 9 is a view illustrating another example of 90° hybrid;

FIG. 10 is a view illustrating another example of 90° hybrid;

(a) to (d) of FIG. 11 are views illustrating one example of a size of each part; and FIG. 12 is a view illustrating a configuration of a wavelength control system using a wavelength monitor.

DESCRIPTION OF THE PREFERRED EMBODIMENTS

To materialize a mass optical communication system that responds to an explosive increase in internet traffic, use of more efficient wavelength resource becomes required. Currently, a fixed grid method in which wavelengths are arranged in a constant 100 GHz or 50 GHz interval for transmission is a mainstream. However, more consideration is given to a flexible grid system that permits use of wavelengths that are integer multiples of 6.25 GHz as specified by ITU-T G.694.1 or a grid-less system that uses an arbitrary wavelength.

A wavelength variable light source used in such a system is often used by being combined with a wavelength monitor for stabilizing an oscillation wavelength. In this case, an output wavelength may be stabilized by monitoring an output wavelength of the wavelength variable light source by the wavelength monitor and feedback-controlling the light source using the monitor output.

Figure 1:
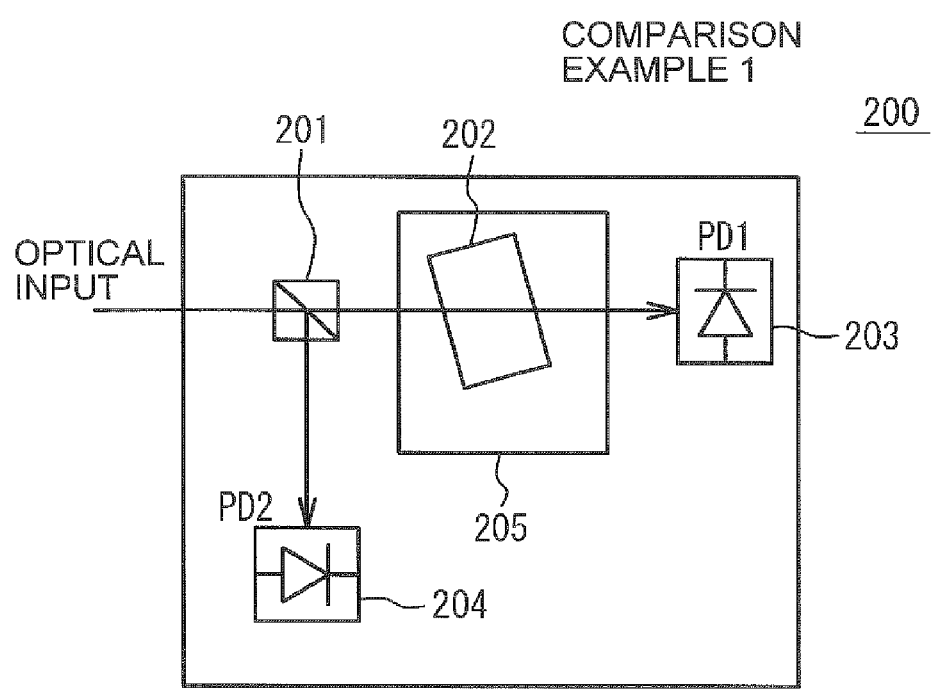
FIG. 1 is a is a view illustrating an example of a configuration of a wavelength monitor associated with Comparison Example 1.

FIG. 1 is a view illustrating an example of a configuration of a wavelength monitor 200 associated with Comparison Example 1. As illustrated in FIG. 1, an input light beam from the wavelength variable light source is incident on a beam splitter 201. One of two branched light beams emitted from the beam splitter 201 transmits an etalon 202 and is incident on a first light receiving element 203, and the other branched light beam does not transmit the etalon and is incident on a second light receiving element 204. Transmission characteristics of the etalon 202 periodically changes in frequency. By using the etalon 202, a frequency fluctuation changes to a light intensity fluctuation. Accordingly, by detecting a ratio between an output of the first light receiving element 203 and an output of the second light receiving element 204, a wavelength of the input light beam may be monitored.

Figure 2:
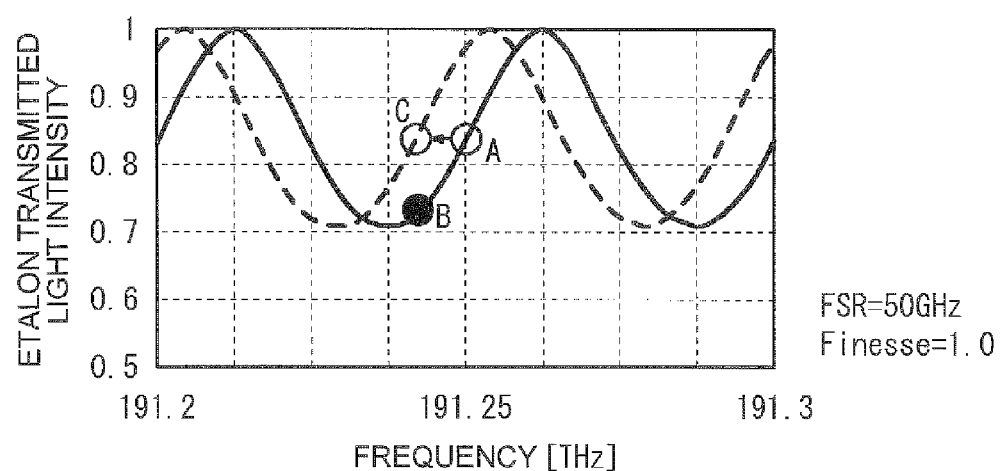
FIG. 2 is a view illustrating transmission characteristics of an etalon.

FIG. 2 is a view illustrating transmission characteristics of the etalon 202. As illustrated by a solid line of FIG. 2, peaks of transmitted light intensity of the etalon 202 appear periodically with regards to frequency. For converting a frequency fluctuation to an intensity fluctuation, it is preferable to monitor a wavelength by using a slope portion (for instance, a point A) of the transmission characteristics. That is because the intensity fluctuation with regards to frequency is large.

In a 50 GHz fixed grid system, when an etalon of a free spectral region (FSR)=50 GHz is used, almost the same slope characteristics may be used over the whole wavelengths. In this case, the etalon 202 is required to have accurate characteristics so as to be a wavelength standard (a frequency standard). Since the transmission characteristics of the etalon 202 changes in accordance with temperature, a temperature of the etalon 202 is controlled to be constant, for instance, by a temperature control apparatus 205 so that desired transmission characteristics may be obtained. The temperature control apparatus 205 is, for instance, a thermo electric cooler (TEC), and includes a Peltier element.

When an attempt is made to apply the wavelength monitor 200 to a flexible grid system or a gridless system, for instance, a wavelength monitor position may be shifted to a point B of FIG. 2. At portions of crests or troughs of the transmission characteristics of the etalon 202, a differential gain with which a frequency fluctuation is converted to an intensity fluctuation becomes small. In such a region, wavelength control becomes difficult (or, such a region becomes a dead band).

To eliminate such a dead band in the wavelength monitor 200, it is required to shift the transmission characteristics of the etalon 202 from the solid line to the dotted line of FIG. 2 by changing a temperature of the etalon 202 or changing an angle of the etalon 202. That is because, by doing so, a wavelength monitor position becomes a point C of a slope portion, and a differential gain similar to the point A is obtained. However, since an operating state of the etalon 202 is changed, it is disadvantageous in terms of time required for the temperature control as well as power consumption.

Although it is possible to enhance resolution with which a wavelength may be set by making FSR of the etalon 202 small, in this case a thickness of the etalon 202 becomes large. For instance, while a thickness of the etalon made of quarts material of FSR=50 GHz is about 2 mm, when FSR is changed from 50 GHz to 12.5 GHz, the thickness becomes four times. Also, since a range in which wavelength control is possible becomes narrow, there is a limit. This is because in a case of a wavelength monitor using a periodic filter, it is not possible to monitor a wavelength change in which a wavelength range exceeds FSR/2.

Figure 3:
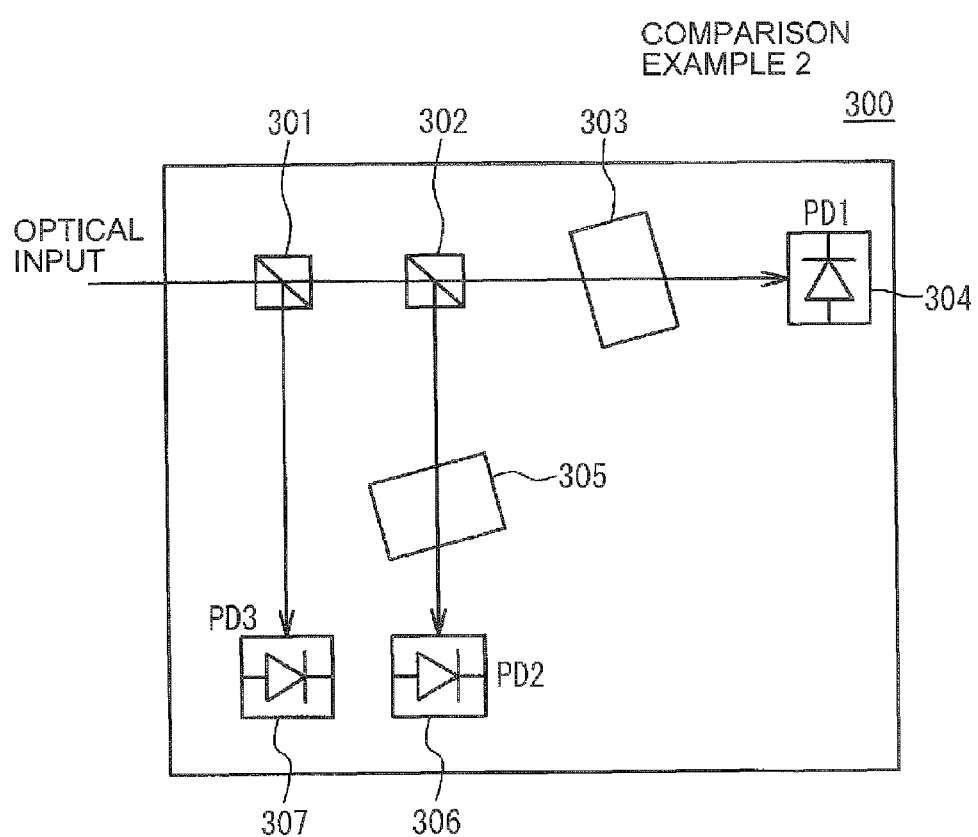
FIG. 3 is a view illustrating an example of a configuration of a wavelength monitor associated with Comparison Example 2.

In view of such a problem, a wavelength monitor 300 associated with Comparison Example 2 may be considered. FIG. 3 is a view illustrating an example of a configuration of the wavelength monitor 300. As illustrated in FIG. 3, an input light beam from a wavelength variable light source is incident on a beam splitter 301. One of two blanched light beams emitted from the beam splitter 301 is incident on a beam splitter 302. One of two blanched light beams emitted from the beam splitter 302 transmits a first etalon 303 and is incident on a first light receiving element 304, and the other one of the blanched light beams transmits a second etalon 305 and is incident on a second light receiving element 306. The other one of the two branched light beams emitted from the beam splitter 301 does not transmit an etalon and is incident on a third light receiving element 307.

Figure 4:
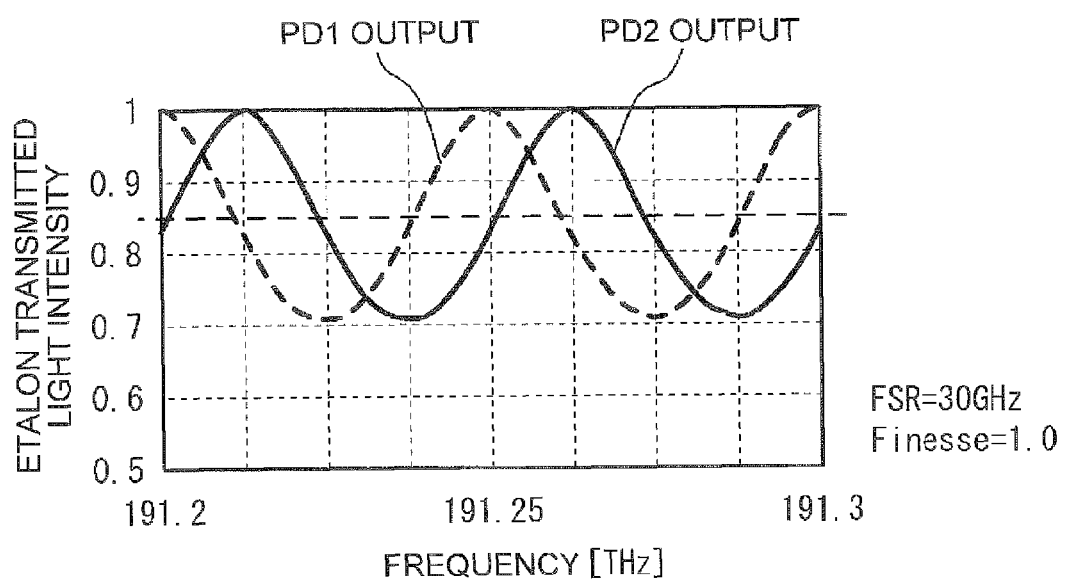
FIG. 4 is a view illustrating transmission characteristics of a first etalon and a second etalon.

FIG. 4 is a view illustrating transmission characteristics of the first etalon 303 and the second etalon 305. In FIG. 4, a dotted line represents an output of the first light receiving element 304. The solid line represents an output of the second light receiving element 306. As illustrated in FIG. 4, the first etalon 303 and the second etalon 305 have the same FSR. The transmission characteristics of the first etalon 303 and the second etalon 305 are so set as to be shifted by FSR/4 ($\pi/2$ in phase) in a frequency direction. Thereby, positions of crests and troughs of the transmission characteristics of the first etalon 303 and the second etalon 305 are made not to be overlapped. Thereby, for instance, when the output of the first light receiving element 304 becomes close to crests or troughs of the transmission characteristics of the first etalon 303 (in the case of becoming a dead band), an output of the second light receiving element 306 may be used for generating a wavelength control signal. Conversely, when the output of the second light receiving element 306 becomes a dead band, the output of the first light receiving element 304 may be used. With such operations, it becomes possible to eliminate a dead band over the entire wavelength range.

Figure 5:
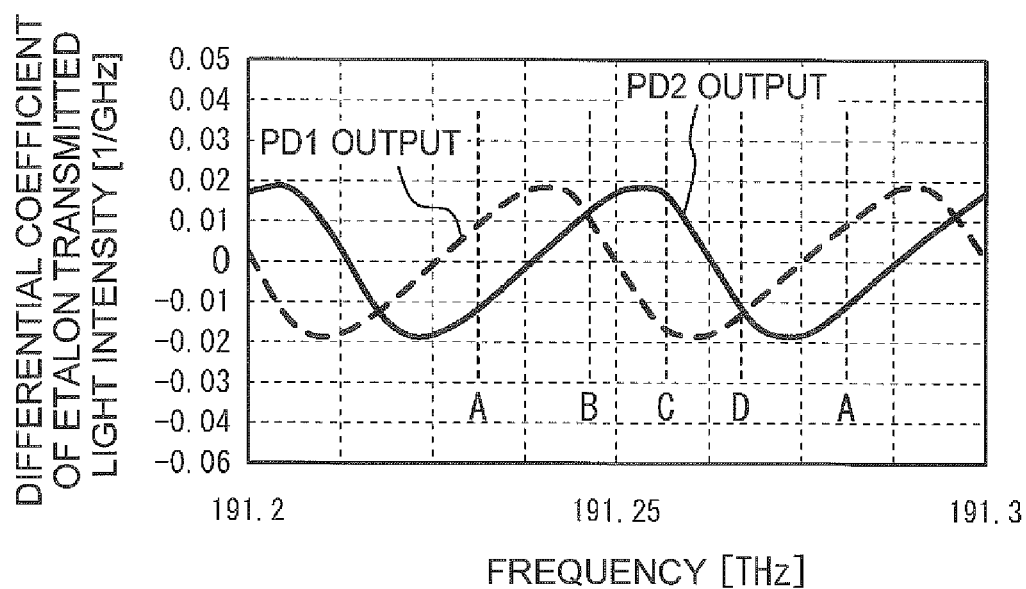
FIG. 5 is a graph illustrating differential coefficients of two transmission characteristics of FIG. 4.

FIG. 5 is a graph illustrating differential coefficients of two transmission characteristics illustrated in FIG. 4. By using the output of the first light receiving element 304 (a differential coefficient is positive) from A to B, the output of the second light receiving element 306 (a differential coefficient is positive) from B to C, the output of the first light receiving element 304 (a differential coefficient is negative) from C to D, and the output of the second light receiving element 306 (a differential coefficient is negative) from D to A, wavelength control becomes possible while using portions where differential gains are large.

In the wavelength monitor 300, monitoring an arbitrary wavelength in a range of FSR/2 becomes possible while keeping operation states of the etalons (temperatures, angles, and such) constant by using either one of the two etalon outputs or both of them depending on a wavelength to be controlled. An output of the third light receiving element 307 is used for identifying a wavelength fluctuation and an input power fluctuation.

However, when a mutual phase relation is made to be shifted by π/2 by changing angles of incidence at two etalons of the same configuration, accuracy of angle of incidence equal to or less than 0.1° is required. When the accuracy of angle of incidence is low, monitor sensitivity is lowered at a specific wavelength and a dead band is generated. It is significantly difficult to stably materialize such an angle with just a mounting accuracy of an optical component. Or, it is also possible to adjust a mutual phase relation by independently controlling temperatures of the respective etalons by, for instance, TEC and such, by using two etalons of the same configuration. However, in this case, since two TECs become required, downsizing of the wavelength monitor becomes difficult.

In the working example below, a wavelength monitor capable of monitoring a wavelength with high accuracy at high speed while suppressing the size is described.

Working Example 1

Figure 6:
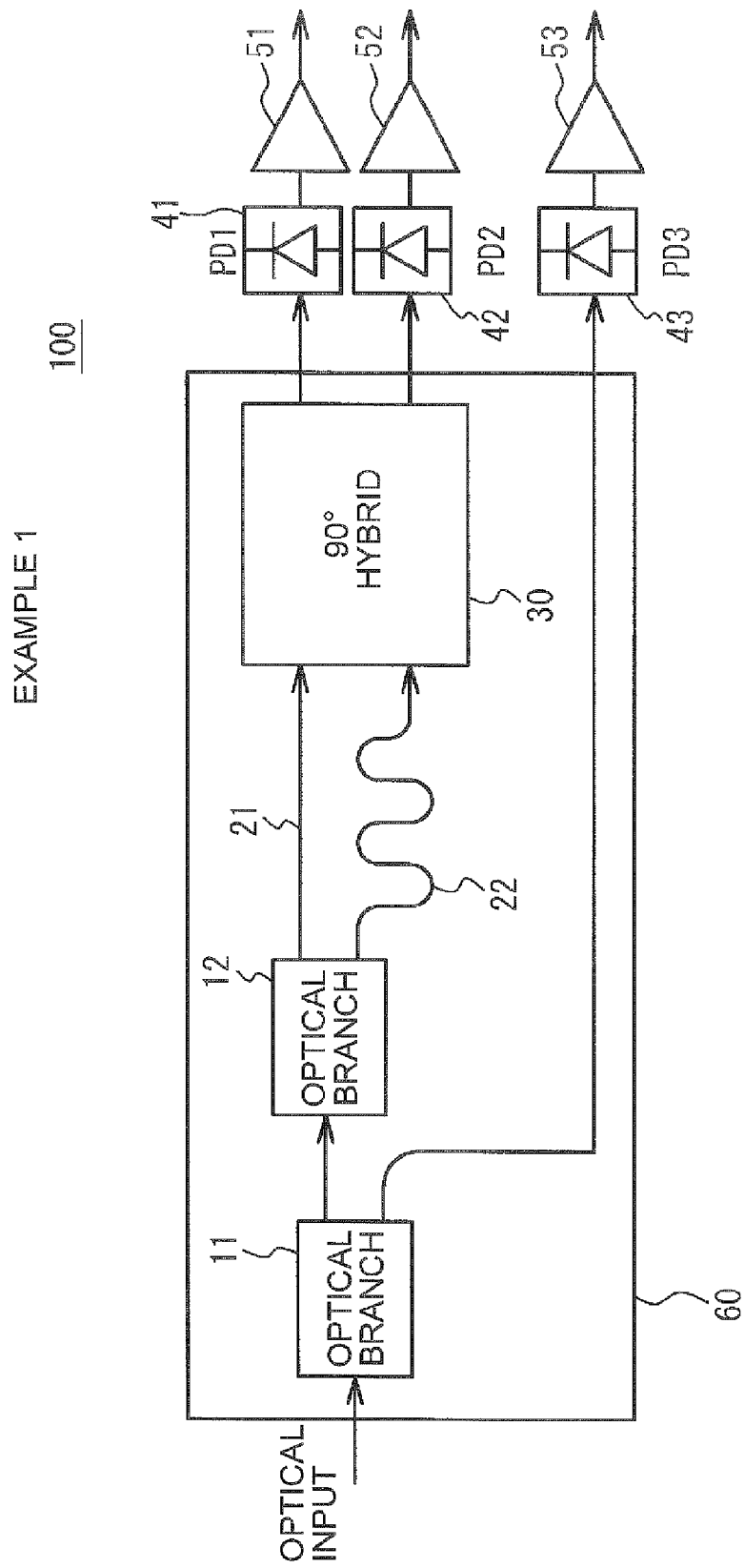
FIG. 6 is a view illustrating an entire configuration of a wavelength monitor associated with Working Example 1.

FIG. 6 is a view illustrating an entire configuration of a wavelength monitor 100 associated with Working Example 1. As illustrated in FIG. 6, the wavelength monitor 100 includes: a first optical branch 11; a second optical branch 12; a first waveguide 21; a second waveguide 22; a 90° hybrid 30; a first light receiving element 41; a second light receiving element 42; a third light receiving element 43; and trans-impedance amplifiers (TIAs) 51 to 53.

One of two branched light beams emitted from the first optical branch 11 is incident on the second optical branch 12, and the other one of two branched light beams is incident on the third light receiving element 43. A current signal obtained by photoelectric conversion of the third light receiving element 43 is input into the TIA 53. The TIA 53 converts the current signal output from the third light receiving element 43 into a voltage signal. Since a wavelength filter and such are not disposed in a path from the first optical branch 11 to the third light receiving element 43, input light beam power may be detected without wavelength dependency by detecting an output of the TIA 53. The output of the TIA 53 may be used for identifying a wavelength fluctuation and an input optical power change.

One of two branched light beams emitted from the second optical branch 12 is incident on one of input terminals of the 90° hybrid 30 via the first waveguide 21. The other one of two branched light beams emitted from the second optical branch 12 is incident on the other one of the input terminals of the 90° hybrid 30 via the second waveguide 22. The first waveguide 21 and the second waveguide 22 have mutually different optical path lengths. Thereby, a propagation delay difference (a phase difference) is provided between the first waveguide 21 and the second waveguide 22. From the phase difference of the two waveguides, optical filter characteristics in which transmission intensity periodically changes with regards to the wavelength are materialized, and the phase difference determines FSR of the optical filter. In other words, the first waveguide 21 and the second waveguide 22 are provided with a function of converting a frequency fluctuation to a light intensity fluctuation.

Here, by denoting a difference between an optical length of the first waveguide 21 and an optical length of the second waveguide 22 as ΔL, refractive index of the first waveguide 21 and the second waveguide 22 as n, and the speed of light as c, FSR may be expressed as follows: FSR=c/(n×ΔL).

The 90° hybrid 30 generates two filter characteristics whose phase relation is shifted by π/2 with regards to a wavelength axis as illustrated in FIG. 4. One of optical signals output from the 90° hybrid 30 is incident on the first light receiving element 41, and the other one of the optical signals output from the 90° hybrid 30 is incident on the second light receiving element 42. A current signal obtained by photoelectric conversion of the first light receiving element 41 is input to the TIA 51. The TIA 51 converts the current signal output by the first light receiving element 41 into a voltage signal. A current signal obtained by photoelectric conversion of the second light receiving element 42 is input to the TIA 52. The TIA 52 converts the current signal output by the second light receiving element 42 into a voltage signal. By monitoring one of or both of the outputs of the TIA 51 and the TIA 52, a fluctuation amount with regards to an arbitrary wavelength may be monitored.

According to the present working example, dynamic temperature control of a wavelength filter as illustrated in Comparison Example 1 is not required. Thereby, high speed wavelength detection is possible. Adjustments of angles of incidence as illustrated in Comparison Example 2 becomes unnecessary. Thereby, highly accurate wavelength detection is possible. Since, there is no need to include a plurality of temperature control apparatuses for temperature adjustment of the wavelength filters, the size may be suppressed. From the above, according to the present working example, it is possible to provide a wavelength monitor capable of detecting a wavelength with high accuracy at high speed while suppressing the size.

In the wavelength monitor 100, the second optical branch 12, the first waveguide 21, the second waveguide 22, and the 90° hybrid 30 may be materialized by a waveguide type device. In this case, it is possible to monolithically integrate on a compound semiconductor substrate such as a silicon substrate or an InP substrate by a semiconductor process. A phase difference of two signals generated by the FSR and the 90° hybrid 30 is determined by accuracy of the semiconductor process. Therefore, more stable characteristics may be obtained compared to the conventional wavelength monitors, which are predicated on precise mounting of optical components. The first optical branch 11, the first light receiving element 41, the second light receiving element 42, and the third light receiving element 43 for optical input monitor may be similarly integrated.

(a) of FIG. 7 is a view illustrating a chip size when a waveguide type device is constituted by providing in a chip the first optical branch 11, the second optical branch 12, the first waveguide 21, the second waveguide 22, and the 90° hybrid 30. As illustrated in (a) of FIG. 7, as one example, the first optical branch 11, the second optical branch 12, the first waveguide 21, the second waveguide 22, and the 90° hybrid 30 may be integrated in a chip of 1.2 mm×0.5 mm.

(b) of FIG. 7 is a view illustrating one example of a manufacturing process of a waveguide. As illustrated in (b) of FIG. 7, a $SiO_2$ layer of 2 μm is formed on a Si substrate, and a Si layer of 220 nm is formed thereon. Next, a waveguide portion is formed by performing etching processing to the Si layer. Then, a $SiO_2$ layer is formed so as to cover the Si layer. Thereby, each waveguide portion is formed. A total thickness of the $SiO_2$ layer is about 4 μm. The waveguide may be formed, for instance, of a semiconductor material such as InP.

In the wavelength monitor 100, the FSRs of the optical filters and a phase difference of two optical filter characteristics may be fluctuated with regards to a temperature fluctuation. However, such a fluctuation of filter characteristics can be easily suppressed by keeping a temperature of the substrate, on which the first waveguide 21, the second waveguide 22, and the 90° hybrid 30 are formed, constant in use of a temperature control apparatus 60, such as a thermo electric cooler (TEC). When the wavelength monitor 100 may be materialized by a compact monolithic integrated element, power consumption associated with the temperature control may be reduced.

The wavelength monitor 100 may produce, in a semiconductor process, light transmission characteristics in which a phase difference is mutually shifted by $\pi/2$ with the same FSR. Thereby, characteristics is stabilized compared to the conventional wavelength monitors that are materialized by mounting optical components, and since monolithic integration is possible, significant improvement in mass productivity, downsizing, and power consumption reduction are possible.

FIG. 8 is a view illustrating one example of the 90° hybrid 30. As illustrated in FIG. 8, the 90° hybrid 30 may include four 2×2 MMI couplers 31 to 34 and a 90° delay part 35. The 90° delay part 35 is a waveguide of a length in which a phase delays by 90°. For the second optical branch 12, a 1×2 MMI coupler is used. An MMI is a multimode interferometer. In the 1×2 MMI coupler, no phase difference is generated between signals output from two output terminals. In the 2×2 MMI coupler, a phase difference of $\pi/2$ is generated between a bar side (a side on which light proceed straightly) and a cross side (a side on which light proceed obliquely) with regards to an input.

The first waveguide 21 is coupled to one of input terminals of the 2×2 MMI coupler 31. The second waveguide 22 is coupled to one of input terminals of the 2×2 MMI coupler 32. An output of the 2×2 MMI coupler 31 on the bar side with regards to the first waveguide 21 is coupled to one of input terminals of the 2×2 MMI coupler 33, and an output on the cross side is coupled to one of input terminals of the 2×2 MMI coupler 34. An output of the 2×2 MMI coupler 32 on the cross side with regards to the second waveguide 22 is coupled to the other input terminal of the 2×2 MMI coupler 33, and an output on the bar side is coupled to the other input terminal of the 2×2 MMI coupler 34 through the 90° delay part 35. The first light receiving element 41 receives an output light beam output from one of output terminals of the 2×2 MMI coupler 33 on the cross side with regards to the outputs of the 2×2 MMI coupler 31. The second light receiving element 42 receives an output light beam output from one of output terminals of the 2×2 MMI coupler 34 on the bar side with regards to the outputs of 2×2 MMI coupler 32. With this configuration, the first light receiving element 41 and the second light receiving element 42 receive two signals having a mutual phase difference of 90°. End terminal parts of a waveguide coupled to the other input terminal of the 2×2 MMI coupler 31, a waveguide coupled to the other input terminal of the 2×2 MMI coupler 32, a waveguide coupled to the other output terminal of the 2×2 MMI coupler 33, and a waveguide coupled to the other output terminal of the 2×2 MMI coupler 34 are not coupled to anywhere. They are, so to speak, free space terminals. The end terminal parts of these waveguides may be coupled to light absorption parts.

FIG. 9 is a view illustrating another example of the 90° hybrid 30. As illustrated in FIG. 9, a 1×2 MMI coupler 36 may be provided in place of the 2×2 MMI coupler 32, and the 90° delay part 35 may not be provided. FIG. 10 is a view illustrating another example of the 90° hybrid 30. As illustrated in FIG. 10, a 4×4 MMI coupler 37 may be used as the 90° hybrid 30. In this case, an input terminal and an output terminal of the 4×4 MMI coupler 37 may be selected so that a phase difference becomes $\pi/2$.

As a method of input optical power monitoring, in addition to a method of monitoring a branched light beam of the first optical branch 11, a sum of two signals having phases shifted by $\pi$ output from the 90° hybrid 30 may be monitored. For instance, although with a 4×4 MMI coupler, by summing outputs from four output terminals, a total power may be monitored, since phase relations of four output terminal are 0, $\pi/2$, $\pi$, and $3\pi/2$, respectively, by summing two outputs having a relation in which a phase difference is $\pi$, respectively, a total power may be monitored.

(a) to (d) of FIG. 11 are views illustrating one example of a size of each part. (a) of FIG. 11 represents a size of the waveguide section. As illustrated in (a) of FIG. 11, the waveguide section may have a width of 500 nm and a thickness of 220 nm. (b) of FIG. 11 represents a size of the 1×2 MMI coupler. As illustrated in (b) of FIG. 11, the 1×2 MMI coupler may have a length of 3 µm, a width of 2 and a thickness of 220 nm. (c) of FIG. 11 represents a size of the 2×2 MMI coupler. As illustrated in (c) of FIG. 11, the 2×2 MMI coupler may have a length of 14 µm, a width of 2 µm, and a thickness of 220 nm. (d) of FIG. 11 represents a size of the 4×4 MMI coupler. As illustrated in (d) of FIG. 11, the 4×4 MMI coupler may have a length of 183 µm, a width of 10 µm, and a thickness of 220 nm.

FIG. 12 is a view illustrating a configuration of a wavelength control system using the wavelength monitor 100. As illustrated in FIG. 12, the controller 110 obtains an output wavelength of a wavelength variable light source 120 according to an output of the wavelength monitor 100. The controller 110 controls the wavelength variable light source 120 so that the obtained wavelength becomes a desired wavelength. Thereby, an output wavelength of the wavelength variable light source 120 may be controlled to be the desired wavelength.

While the working example of the present invention have been illustrated in detail, the present invention is not limited to the above-mentioned specific example, and other variations and modifications may be made without departing from the scope of the present invention described in the claims.

What is claimed is:

1. A wavelength monitor comprising:
  a branch waveguide section configured to branch an input light beam and generate two outputs routed via paths having mutually different optical path lengths;
  an optical synthesis section including a multimode interferometer, the optical synthesis section configured to synthesize the two outputs and output two optical signals having different light intensities with regards to a wavelength of the input light beam and exhibiting a mutual phase difference;
  a first photodiode and a second photodiode that convert the two optical signals from the optical synthesis section to two current signals;
  a third photodiode; and
  an optical branch, a first end of which is coupled to the branch waveguide section and a second end of which is coupled to the third photodiode that converts an optical input to a current signal representing intensity of the input light beam of the wavelength monitor.

2. The wavelength monitor according to claim 1, wherein the output phase difference of the optical synthesis section is 90°.

3. The wavelength monitor according to claim 1, wherein the optical synthesis section includes any one of a 4 inputs 4 outputs multimode interferometer, a combination of a 2 inputs 2 outputs multimode interferometer and an optical delay section to cause an optical delay, or a combination of a 1 input 2 outputs multimode interferometer and a 2 inputs 2 outputs multimode interferometer.

4. The wavelength monitor according to claim 1, wherein the branch waveguide section and the optical synthesis section are integrated on a same substrate.

5. The wavelength monitor according to claim 1, further comprising a temperature control apparatus including a thermoelectric cooler, the temperature control apparatus configured to maintain temperatures of the branch waveguide section and the optical synthesis section at an instructed temperature.

\* \* \* \* \*